(12) United States Patent
Guo et al.

(10) Patent No.: US 11,797,739 B2
(45) Date of Patent: Oct. 24, 2023

(54) ENDPOINT PATH MARGIN BASED INTEGRATED CIRCUIT DESIGN USING SUB-CRITICAL TIMING PATHS

(71) Applicant: Synopsys, Inc., Mountain View, CA (US)

(72) Inventors: Deyuan Guo, Fremont, CA (US); Kailash Pawar, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 122 days.

(21) Appl. No.: 17/478,882

(22) Filed: Sep. 18, 2021

(65) Prior Publication Data

US 2022/0092245 A1    Mar. 24, 2022

Related U.S. Application Data

(60) Provisional application No. 63/081,103, filed on Sep. 21, 2020.

(51) Int. Cl.
| | |
|---|---|
| *G06F 30/30* | (2020.01) |
| *G06F 30/3312* | (2020.01) |
| *G06F 30/3315* | (2020.01) |
| *G06F 30/337* | (2020.01) |
| *G06F 119/12* | (2020.01) |

(52) U.S. Cl.
CPC ........ *G06F 30/3312* (2020.01); *G06F 30/337* (2020.01); *G06F 30/3315* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 8,336,012 | B2* | 12/2012 | Fry | G06F 30/30 |
| | | | | 716/108 |
| 8,788,995 | B1* | 7/2014 | Kumar | G06F 30/3312 |
| | | | | 716/112 |
| 9,064,073 | B2* | 6/2015 | Mottaez | G06F 30/30 |
| 9,607,122 | B2* | 3/2017 | Le Bars | G06F 30/3312 |
| 9,875,333 | B1* | 1/2018 | Verma | G06F 30/3312 |
| 10,296,700 | B1* | 5/2019 | Bai | G06F 30/394 |
| 10,534,883 | B1* | 1/2020 | Bai | G06F 30/327 |
| 10,678,989 | B2* | 6/2020 | Chen | G06F 30/367 |
| 2018/0137217 | A1* | 5/2018 | Walston | G06F 1/10 |
| 2018/0247007 | A1* | 8/2018 | Chen | G06F 30/394 |

* cited by examiner

*Primary Examiner* — Leigh M Garbowski
(74) *Attorney, Agent, or Firm* — Patterson + Sheridan, LLP

(57) ABSTRACT

Techniques for integrated circuit (IC) design are disclosed. A path margin is determined for an endpoint of a plurality of timing paths for an IC design. This includes identifying a sub-critical path, among the plurality of timing paths, where the sub-critical path has more slack than a critical path relating to the endpoint. The path margin is generated based on a first slack associated with the sub-critical path. A second slack, relating to at least one of the plurality of timing paths, is modified from a first value to a second value, based on the path margin. A design metric relating to the IC design is updated based on the modified second slack. The IC design is configured to be used to fabricate an IC.

17 Claims, 11 Drawing Sheets

ENDPOINT PATH MARGIN BASED INTEGRATED CIRCUIT DESIGN USING SUB-CRITICAL TIMING PATHS

CROSS-REFERENCE TO RELATED APPLICATION

This application claims priority to and the benefit of U.S. Provisional Patent Application No. 63/081,103, filed Sep. 21, 2020, which is incorporated by reference in its entirety.

TECHNICAL FIELD

The present disclosure generally relates to an electronic design automation (EDA) system. More specifically, the present disclosure relates to a system and method for providing an endpoint path margin based integrated circuit (IC) design using sub-critical timing paths.

BACKGROUND

Timing analysis allows an integrated circuit (IC) designer to validate the timing performance of a design before eventually fabricating an IC. For example, static timing analysis (STA) can be used to identify timing paths in a design, calculate signal propagation delay along the paths, and check for violations of timing constraints. An IC designer can then modify the design, based on the STA results, to improve the identified timing metrics and meet required timing constraints. This ensures that the eventual fabricated IC meets required timing constraints.

SUMMARY

Embodiments include a method. The method includes determining a path margin for an endpoint of a plurality of timing paths for an integrated circuit (IC) design, including identifying a sub-critical path, among the plurality of timing paths, where the sub-critical path includes more slack than a critical path relating to the endpoint, and generating the path margin based on a first slack associated with the sub-critical path. The method further includes modifying a second slack relating to at least one of the plurality of timing paths, from a first value to a second value, based on the path margin. The method further includes updating a design metric relating to the IC design based on the modified second slack. The IC design is configured to be used to fabricate an IC.

Embodiments further includes a system. The system includes a processor, and a memory storing instructions, which when executed by the processor, cause the processor to perform operations. The operations include determining a path margin for an endpoint of a plurality of timing paths for an integrated circuit (IC) design, including generating the path margin based on a first slack associated with a path of the plurality of timing paths. The operations further include modifying a plurality of slacks relating to each of the plurality of timing paths based on the path margin. The operations further includes updating a design metric relating to the IC design based on at least one of the modified plurality of slacks, wherein the IC design is configured to be used to fabricate an IC.

Embodiments further include a non-transitory computer readable medium including stored instructions, which when executed by a processor, cause the processor to perform operations. The operations include determining a path margin for an endpoint of a plurality of timing paths for an integrated circuit (IC) design, including determining that a first slack associated with a first timing path, among the plurality of timing paths, is negative, and generating the path margin based on the first slack. The operations further include modifying a second slack relating to at least one of the plurality of timing paths, from a first value to a second value, based on the path margin. The operations further include updating a design metric relating to the IC design based on the modified second slack, wherein the IC design is configured to be used to fabricate an IC.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

DETAILED DESCRIPTION

Figure 1A:
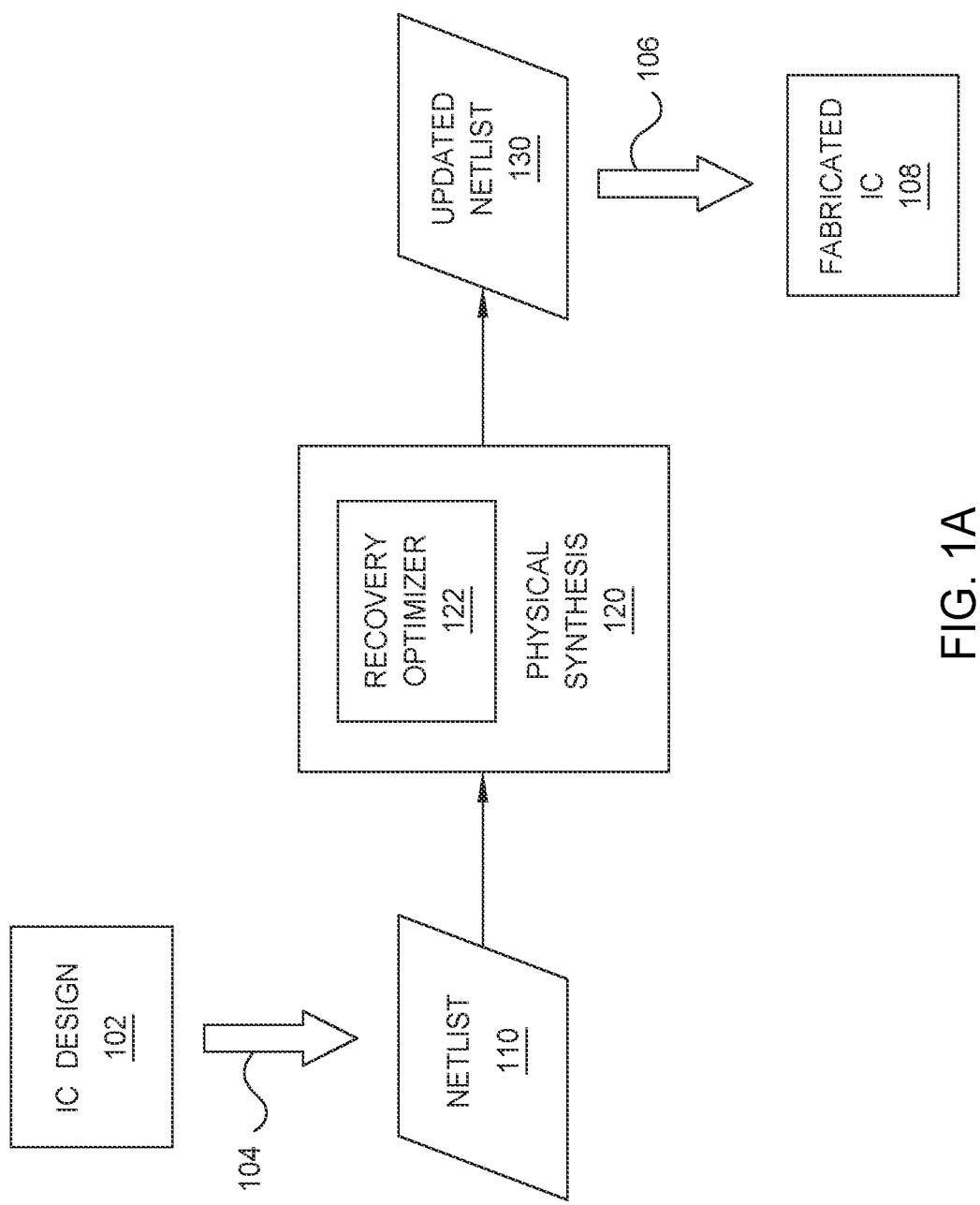
FIG. 1A illustrates recovery optimization for an IC design, according to one embodiment.

During timing analysis, an IC design can include a budget of timing constraints (e.g., user-defined timing constraints). Timing analysis identifies start-points and endpoints for timing paths, and can determine whether these timing constraints are met along a given timing path. For example, a start-point refers to a start of a timing path (e.g., where data is launched by a clock edge or where the data is available at a specific time), including an input port or a register clock pin. An endpoint refers to an end of a timing path (e.g., where data is captured by a clock edge or where the data is available at a specific time), including a register data input pin or an output port. A path in which a timing constraint is met can be referred to as having positive slack. A path in which a timing constraint is not met can be referred to as having negative slack. Timing optimization for a design can then focus on optimizing paths with negative slack, to ensure that all timing constraints are met.

In an embodiment, recovery optimization techniques can be used to update (e.g., improve) a wide variety of non-timing design metrics for an IC, including power, performance, area (PPA) metrics. For example, non-timing metrics can relate to area (e.g., combinational area recovery or sequential area recovery), power usage (e.g., combinational power recovery or sequential power recovery), layer demotion, buffer removal (e.g., modifying a netlist to remove buffers), logic restructuring for area and power, etc. These are merely examples, and any suitable metrics and techniques can also be used.

Improvement to these non-timing design metrics, however, can affect the timing performance of a given path. For example, improving non-timing metrics can result in degraded timing for one or more paths in the design. This can affect key timing metrics like worst negative slack (WNS) and total negative slack (TNS) for a given IC design. In an embodiment, WNS is the worst slack among the timing paths for the IC design, and TNS is the sum of the worst negative slack per endpoint in the IC design. In an embodiment TNS can be path-group specific, or design specific (e.g., the sum of the worst negative slack per endpoint, across all path groups).

In one embodiment, recovery optimization can avoid this by improving one or more of these non-timing design metrics, while protecting design timing metrics (e.g., WNS and TNS). For example, a recovery optimizer can operate only on paths with positive slack, reducing the positive slack in exchange for improvement to non-timing design metrics. This can result in an improvement to non-timing metrics, without affecting WNS and TNS (e.g., because only paths with positive slack are modified).

But operating only on paths with positive slack can limit the amount of non-timing design metric improvement achieved by the recovery optimizer. Instead, or in addition, in an embodiment, the present recovery optimization method is used to recover non-timing design metrics, without affecting key timing metrics like WNS and TNS, by adjusting timing for sub-critical paths with negative slack. In an embodiment, a given endpoint in a design can be associated with multiple paths. The path with the worst slack (e.g., most negative slack or least positive slack) to that endpoint is the critical path. Paths with better slack than the critical path, to that endpoint, are sub-critical paths, which may have either negative or positive slack. In an embodiment, degrading the timing of a critical path is likely to affect the overall timing performance for a design. The timing of a sub-critical path, however, can sometimes be degraded without affecting the overall timing performance of the design (e.g., because the sub-critical path remains faster than the critical path, even after adjustment).

For example, given a specific scenario, there can be multiple timing paths ending at the same timing endpoint. A recovery optimizer may label the endpoint with the worst slack among all these timing paths (e.g., the critical path). That is, the recovery optimizer may treat the endpoint as being associated with the slack of the critical path for purposes of recovery optimization. This is true for both individual paths and path groups. Timing paths ending at the same endpoint may belong to different path groups, and a recovery optimizer can label the endpoint, with respect to that path group, with the worst slack among timing paths in that path group (e.g., the critical path). The labeled slack of the endpoint, used for recovery optimization, is therefore dominated by the critical path, and the labeled endpoint slack does not reflect the slack of sub-critical paths. Slack of the sub-critical timing paths can be either negative or positive, and techniques described herein can be used to, in certain circumstances, degrade those sub-critical paths down to the critical slack without affecting the endpoint slack, as well as without affecting design WNS and TNS.

For example, an endpoint path margin can be computed and used to adjust timing for sub-critical paths, without affecting overall timing metrics for the design. In one embodiment, if an endpoint has a sub-critical path with negative slack, an endpoint path margin can be temporarily added. As a result, slack of all critical and sub-critical timing paths ending at this endpoint will be shifted by the same amount. Sub-critical paths with negative slack can be adjusted to appear as though they have positive slack by adding the endpoint path margin, and sub-critical paths with positive slack can be adjusted to appear as though they have additional positive slack.

A recovery optimizer can then adjust non-timing design metrics while taking up positive slack. For example, the recovery optimizer can provide combinational area recovery, sequential area recovery, combinational power recovery, sequential power recovery, layer demotion, buffer removal (e.g., modifying a netlist to remove buffers), logic restructuring for area and power, or any other suitable recovery optimization technique. After the recovery optimization, the sub-critical paths can then be re-adjusted to remove the endpoint path margin and restore timing. This is discussed further below with regard to FIGS. 3-6. This can allow a recovery optimizer to improve non-timing design metrics, without degrading overall design WNS and TNS (e.g., without affecting the timing of critical paths). In an embodiment, this can be a powerful technique because an IC design can include a significant number of nets and cells on sub-critical timing paths before timing is finally converged, and, by using endpoint path margin techniques, the recovery optimizer can improve non-timing design metrics for these nets and cells on sub-critical timing paths, without degrading overall design WNS and TNS and without affecting the timing of critical paths.

FIG. 1A illustrates recovery optimization for an IC design, according to one embodiment. In an embodiment, an IC design 102 can be used to generate a netlist 110 through one or more steps 104. For example, as discussed below in relation to FIG. 7, the IC design 102 can be described using hardware description language (HDL) or another desired description language. The HDL code describing the IC design 102 can be transformed into the netlist 110 (e.g., during a synthesis and design for test phase), and the generated netlist 110 can describe the electrical connectivity for the IC design 102. This is just one example, and the netlist 110 can be generated using any desired technique.

A physical synthesis system 120 can include computer program instructions stored in a memory which, when executed by one or more compute processors, act as a recovery optimizer 122. This is illustrated further in FIG. 2. The recovery optimizer 122 can generate an updated netlist 130 from the netlist 110. In an embodiment, the recovery optimizer 122 calculates an endpoint path margin for one or more endpoints in the netlist 110. The recovery optimizer 122 can modify timing values for the updated netlist 130, using the endpoint path margin, to improve non-timing design metrics, without degrading design timing metrics (e.g., WNS and TNS). This is discussed below with regard to FIGS. 3-5. An IC design can include many sub-critical timing paths, before the timing is finally converged, where the slack of each of these paths is either positive or negative but not dominant (e.g., they have negative slack but have no contribution to design WNS and TNS). Non-timing design metrics on such sub-critical paths can be improved, without degrading design WNS and TNS. This can be illustrated further using FIG. 1B.

Figure 1B:
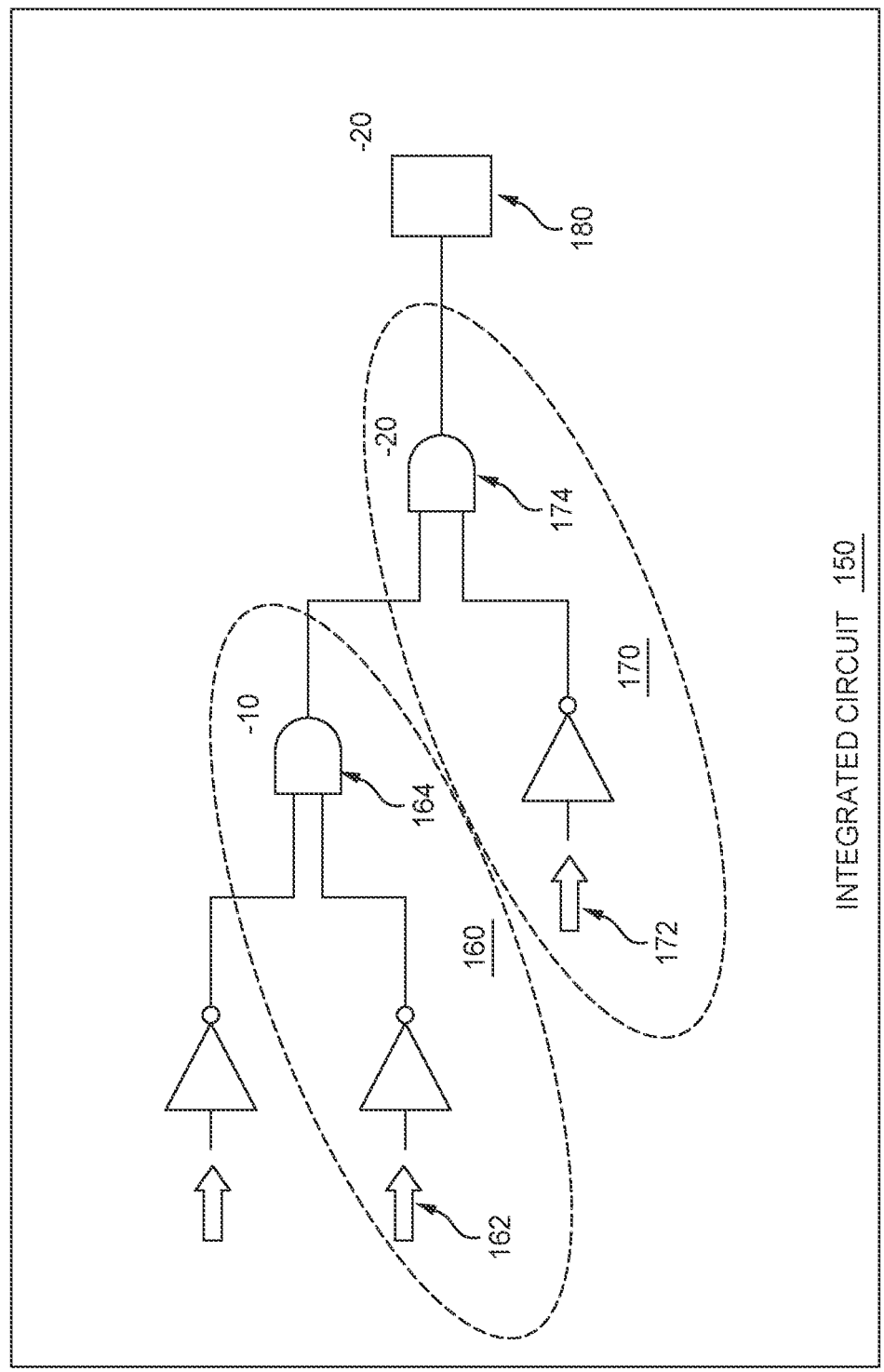
FIG. 1B illustrates using an endpoint path margin for recovery optimization for an IC design, according to one embodiment.

FIG. 1B illustrates using an endpoint path margin for recovery optimization for an IC design, according to one embodiment. An integrated circuit 150 includes two paths 160 and 170 and a circuit endpoint 180. The paths 160 and 170 include respective start-points 162 and 172 leading to respective endpoints 164 and 174. This is merely one example, and actual ICs include numerous endpoints and paths.

In an embodiment, the path 160 has a slack of −10 picoseconds (ps) and the path 170 has a slack of −20 ps. The slack of path 170 is less than the slack of the path 160, and so the path 170 is the critical path to the endpoint 180. This makes the path 160 a sub-critical path. As discussed below in relation to FIGS. 3-5, an endpoint path margin can be computed for the path 160. For example, the endpoint path margin could be computed as 20 ps, the slack of the critical path, as discussed further below with regard to FIGS. 5A-5B. The endpoint path margin of 20 ps can then be added to each of the paths 160 and 170. The slack of the path 160 increases from −10 ps to +10 ps, while the slack of the path 170 increases from −20 ps to 0ps. Thus, the path 160 has slack increased from a negative value to a positive value, while the path 170 remains as the critical path.

Recovery optimization can then be performed on the integrated circuit 150, using the techniques discussed above to adjust non-timing design metrics. For example, the recovery optimization can identify that path 160 includes a positive slack: +10 ps. The recovery optimization can improve non-timing design metrics by using up some of that positive slack (e.g., degrading the path 160, by up to 10 ms). But because the path 160 is not the critical path, this will not affect the design timing metrics (e.g., WNS and TNS). After the recovery optimization, the endpoint path margin (e.g., the added 20 ms) can be removed from the paths 160 and 170, restoring their timing (e.g., the original timing values with the addition of any change from the recovery optimization).

Returning to FIG. 1A, the updated netlist 130 is generated using the recovery optimization and the added (and then removed) endpoint path margin. The updated netlist 130 can then be used to generate a fabricated IC 108, using one or more steps 106. This is discussed further with regard to blocks 722-740 illustrated in FIG. 7.

Figure 2:
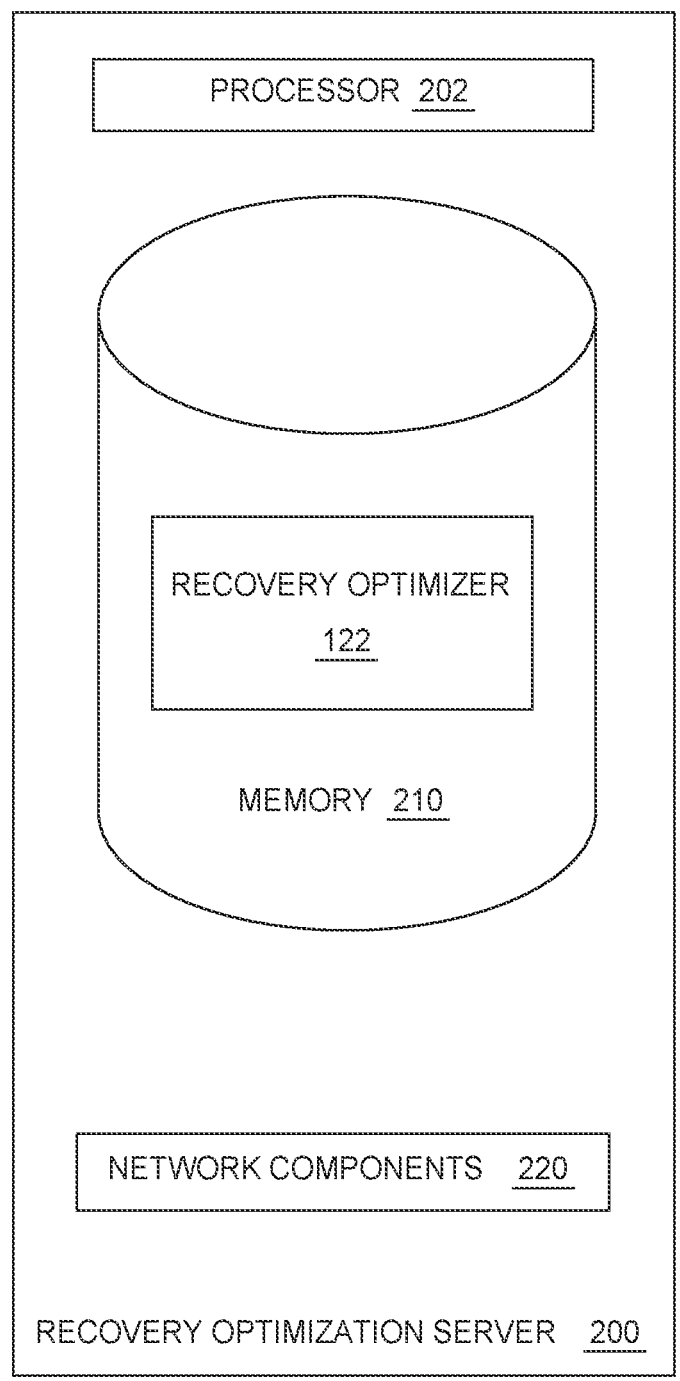
FIG. 2 illustrates a recovery optimization server for recovery optimization for an IC design, according to one embodiment.

FIG. 2 illustrates a recovery optimization server 200 for recovery optimization for an IC design, according to one embodiment. The recovery optimization server 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the recovery optimization server 200 to interface with a suitable communication network. For example, the network components 220 can include wired, Wi-Fi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally stores instructions for performing various functions related to use of the recovery optimization server 200. In an embodiment, the memory 210 includes computer program instructions which, when executed, act as the recovery optimizer 122 and facilitate recovery optimization for an IC design using endpoint path margin. This is discussed further below with regard to FIGS. 3-6.

Figure 3:
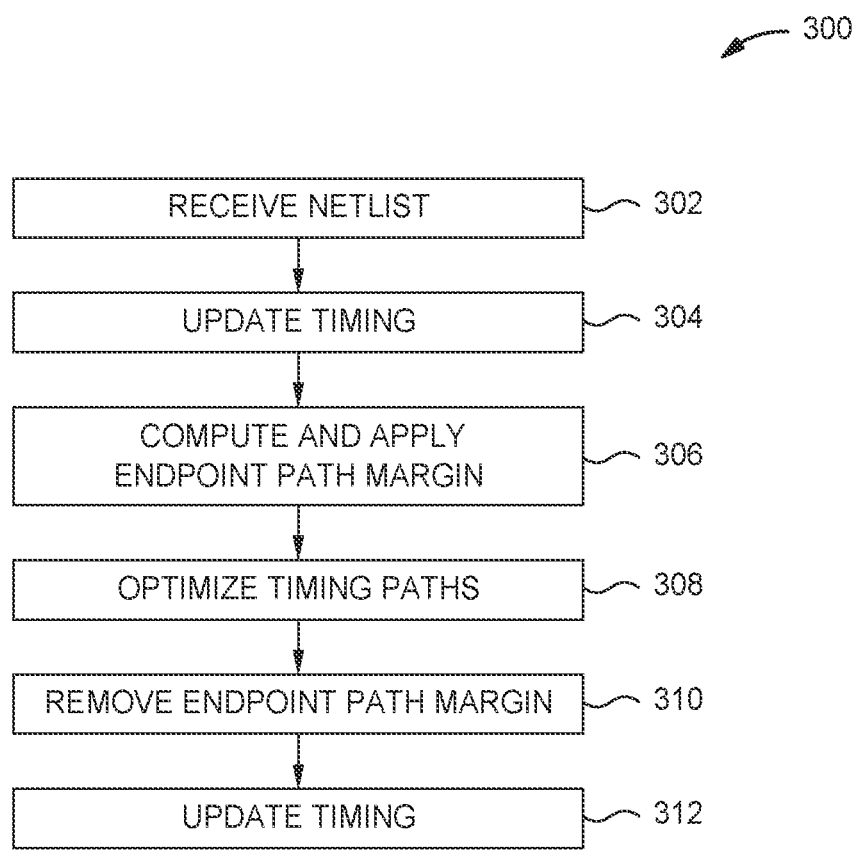
FIG. 3 is a flowchart illustrating recovery optimization for an IC design, according to one embodiment.

FIG. 3 is a flowchart 300 illustrating recovery optimization for an IC design, according to one embodiment. In an embodiment, at 302, a recovery optimizer (e.g., the recovery optimizer 122 illustrated in FIGS. 1-2) receives a netlist. For example, the netlist can describe the electrical connectivity for an IC design (e.g., the netlist 110 illustrated in FIG. 1).

At 304, the recovery optimizer updates timing for the netlist. In an embodiment, this timing update allows the recovery optimizer to work with up-to-date timing values for the netlist. For example, the recovery optimizer can update the slack associated with each path and endpoint in the netlist.

At 306, the recovery optimizer computes and applies an endpoint path margin to an endpoint. This is discussed further below with regard to FIGS. 4-6. For example, the recovery optimizer can calculate endpoint path margins for a set of endpoints (e.g., for sub-critical paths for those endpoints), and adjust the slack for use by the recovery optimizer, so that the recovery optimizer can optimize sub-critical timing paths with negative slack as if they are positive, without degrading design WNS and TNS.

At 308, the recovery optimizer operates on positive slack timing paths (e.g., after an endpoint path margin is added at 306) using any desired recovery optimization techniques (e.g., working on positive-slack timing paths to recover non-timing design metrics). For example, the recovery optimizer can recover non-timing metrics using techniques including, but not limited to, combinational area recovery, combinational power recovery, sequential area recovery, sequential power recovery, layer demotion, buffer removal, and logic restructuring for area and power. A common characteristic of many typical recovery optimizers, however, is that they may degrade positive-slack timing paths down to zero for optimizing non-timing design metrics. Degrading a positive slack down to zero does not have any direct impact on design WNS and TNS (e.g., because the path has positive slack). In an embodiment, one advantage of using an endpoint path margin is that it can support different kinds of recovery optimization techniques, and there is no need to modify the recovery optimization techniques. That is, adding the endpoint path margin changes the slack values for the recovery optimizer so that the recovery optimizer acts as though sub-critical paths have additional slack, and improves non-timing design metrics by degrading the timing in these sub-critical paths (e.g., using up the additional slack). Once endpoint path margins are applied and timing is refreshed, there is no need to recalculate margin during recovery optimization.

At 310, the recovery optimizer removes endpoint path margin, or, if applicable reverts the endpoint timing values back to the original values provided by a user or other components (e.g., before the adjustments at 306). For example, the recovery optimizer can maintain a table of values at 306 marking the adjusted timing margin values (e.g., in volatile or non-volatile memory), and can revert these changes at 310. This is merely an example, and any desired technique can be used. All applied endpoint path margins are removed or restored to original on all endpoints after recovery optimization. Since recovery optimization techniques are designed to not degrade design WNS and TNS, the design WNS and TNS will be restored to incoming values without degradation, once all path margins are removed.

At 312, the recovery optimizer updates timing. For example, the recovery optimizer can propagate timing changes (e.g., from the optimizing at 308) throughout the IC design. That is, during the recovery optimization at 308, various timing values may have changed as a byproduct of improving non-timing design metrics. At 312 the recovery optimizer propagates these changes throughout the IC design.

Figure 4:
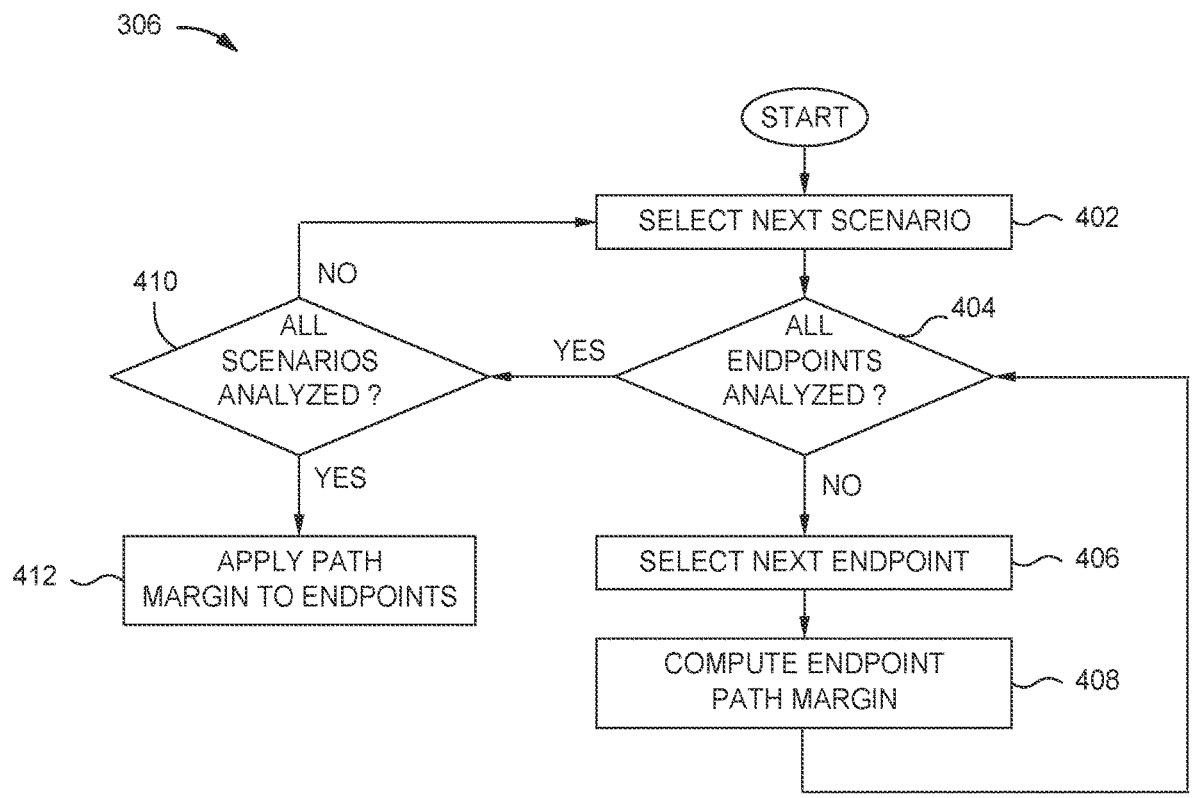
FIG. 4 is a flowchart illustrating computing and applying endpoint path margins for recovery optimization for an IC design, according to one embodiment.

FIG. 4 is a flowchart illustrating computing and applying endpoint path margins for recovery optimization for an IC design, according to one embodiment. In an embodiment, FIG. 4 corresponds with 306 illustrated in FIG. 3. At 402, a recovery optimizer (e.g., the recovery optimizer 122 illustrated in FIGS. 1-2) selects a next scenario. In an embodiment, the recovery optimizer computes an endpoint path margin per scenario (e.g., per scenario designated by a designer of the IC) and per endpoint. For example, an IC designer can designate a number of scenarios relating to different characteristics, including temperature, voltage, etc. Each of these scenarios can be associated with its own timing analysis.

Further, in an embodiment, the recovery optimizer also considers path groups. In an embodiment, a given IC design can have multiple path groups. For example, a design can have multiple clocks. Path groups can be defined per-clock, such that one or more path groups are associated with each clock. This can facilitate clock-specific timing analysis. In addition, an IC designer can create user-defined path groups for tracking timing of a specific group of timing paths. In an embodiment, the recovery optimizer can perform the techniques illustrated in FIG. 4 for each path group.

At 404, the recovery optimizer determines whether all endpoints for the current scenario have been analyzed. As discussed above, in an embodiment, an IC design includes many endpoints. In an embodiment, the recovery optimizer computes an endpoint path margin on a per-scenario and per-endpoint basis. If all endpoints have not been analyzed, the recovery optimizer proceeds to 406 and selects the next endpoint.

At 408, the recovery optimizer computes an endpoint path margin for the selected endpoint. This is discussed further with regard to FIGS. 5A-B, below. In an embodiment, the recovery optimizer computes these path margin values so that after applying the path margin values to the IC, slack for these sub-critical timing paths is adjusted towards positive by the amount of the calculated margin, while slack for any critical timing paths will remain zero or negative. As discussed above in relation to 308 in FIG. 3, recovery optimization techniques can then be used on the adjusted timing paths. In an embodiment, the recovery optimizer will attempt to recover non-timing design metrics for adjusted sub-critical paths, because the recovery optimizer treats these adjusted sub-critical paths as having positive slack. In one embodiment, the recovery optimizer does not recover non-timing metrics for critical paths, because these critical paths still have zero or negative slack. After the recovery optimizer computes the endpoint margin, it returns to 404 and determines whether all endpoints have been analyzed. If all endpoints have been analyzed, the recovery optimizer proceeds to 410.

At 410, the recovery optimizer determines whether all scenarios have been analyzed. If not, the recovery optimizer returns to 402. If so, the recovery optimizer proceeds to 410.

At 412, once all endpoint path margins are computed (e.g., for each scenario and endpoint, as discussed above), the recovery optimizer applies the endpoint path margin values to the timing endpoints. With the path margin, a required time of each negative-slack endpoint will be shifted, thus the slack of the endpoint will be shifted by the same amount towards zero. With a timing update, timing changes of all adjusted endpoints will be propagated to the entire circuit from endpoints to start points, and the slack of all cells will be refreshed. In an embodiment, whenever multiple timing paths are converged during the backwards propagation, a timer module takes a floor of required timing and honors the most critical timing path. After the timing update, sub-critical timing paths become positive (e.g., because of the adjustments described above), so that a recovery optimizer can perform optimization with the new timing picture.

Figure 5A:
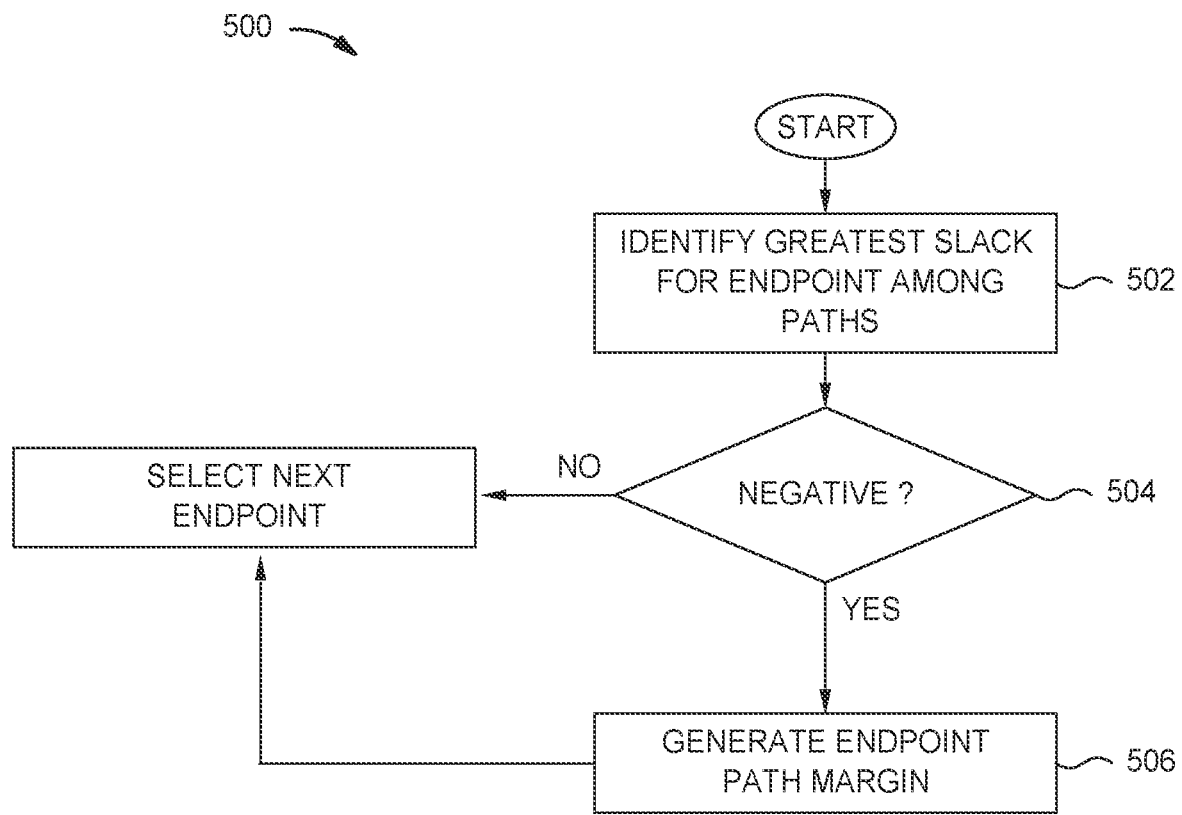
FIG. 5A is a flowchart illustrating determining an endpoint path margin for recovery optimization for an IC design, according to one embodiment.

FIG. 5A is a flowchart 500 illustrating determining an endpoint path margin for recovery optimization for an IC design, according to one embodiment. In an embodiment, FIG. 5A corresponds with 408 illustrated in FIG. 4. At 502, a recovery optimizer (e.g., the recovery optimizer 122 illustrated in FIGS. 1-2) identifies the greatest slack for a selected endpoint, among the paths for that endpoint (e.g., among sub-critical paths). For example, the recovery optimizer can determine the greatest slack among all paths, or path groups, associated with the endpoint. In an embodiment, a given endpoint can be associated with multiple path groups. The recovery optimizer can iterate through these multiple path groups and determine the path group with the greatest slack for the paths associated with the selected endpoint. Because this path group has the greatest slack, it will be a sub-critical path.

For example, a given endpoint may be associated with three path groups, each of which has negative slack in a path associated with the endpoint. In an embodiment, the recovery optimizer selects the path group with the slack closest to zero (i.e., the highest value), since all the path groups have negative slack. Alternatively, one or more of the path groups may have positive slack in a path associated with the endpoint, and the recovery optimizer can select the path group with the highest positive slack. As discussed below, however, if the recovery optimizer selects a path group with a positive slack the recovery optimizer can skip the associated endpoint without generating an endpoint path margin, and can proceed to select the next endpoint. In an embodiment, using the greatest slack can ensure timing in all path groups are protected, after adjustment (e.g., by avoiding affecting timing of critical paths). Selecting the greatest slack among path groups is one example, and any suitable technique can be used. For example, a user can designate a subset of path groups, and the recovery optimizer can select a path among the designated subset of path groups.

At block 504, the recovery optimizer determines whether the selected greatest slack is negative. If the greatest slack is negative, the recovery optimizer proceeds to 506.

At 506, the recovery optimizer generates the endpoint path margin. For example, the recovery optimizer can compute the endpoint path margin as [multiplier*slack], where the slack value is the slack selected at 502. In an embodiment, the multiplier is a fixed number that can scale the path margin value, so that some near-critical timing paths can be protected if needed.

For example, timing analysis during optimization may be somewhat imprecise due to limited context. Use of a multiplier can provide a margin of error to protect against this scenario, where a critical path has been incorrectly identified as a sub-critical path. Typically, the multiplier will be either 1, or a value between 0 and 1. In an embodiment, the multiplier is determined by a designer of the recovery optimizer. Alternatively, an IC designer could configure the multiplier (e.g., by setting a configuration parameter or by using a suitable user interface).

The adjusted endpoint slack, after applying path margin and updating timing, will be (1−multiplier)*slack. For example, the adjusted endpoint slack will be zero if the multiplier is set to 1.0.

Returning to 504, if the selected greatest slack is not negative (i.e., it is 0 or positive), the recovery optimizer skips the endpoint and selects the next endpoint. In an embodiment, computing and applying an endpoint path margin for endpoints with positive slack may degrade timing for recovery optimization. A recovery optimizer can already optimize paths with positive slack (as discussed above), and so no adjustment is needed. This, however, is merely one example. Alternatively, or in addition, the recovery optimizer can also adjust positive slack values to be more positive. For example, this can be useful to meet aggressive targets for non-timing metrics (e.g., early in a design process). While this approach can lead to some timing degradation, it can allow the recovery optimizer to meet the more aggressive targets for non-timing metrics.

Figure 5B:
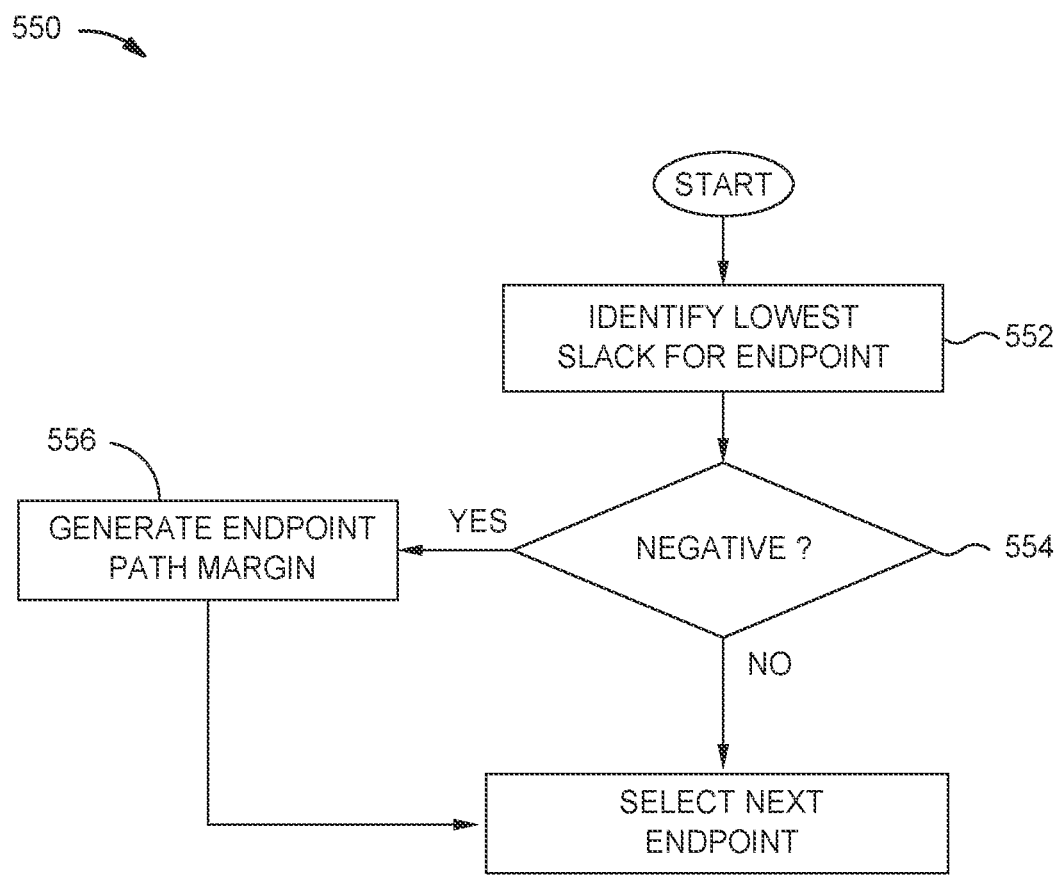
FIG. 5B is a flowchart further illustrating determining an endpoint path margin for recovery optimization for an IC design, according to one embodiment.

FIG. 5B is a flowchart 550 further illustrating determining an endpoint path margin for recovery optimization for an IC design, according to one embodiment. In an embodiment, FIG. 5B is similar to FIG. 5A except a recovery optimizer (e.g., the recovery optimizer 122 illustrated in FIGS. 1-2) identifies the lowest slack for a selected endpoint. As discussed above, in an embodiment, the recovery optimizer improves non-timing metrics without affecting WNS and TNS. This can be done, for example, by selecting the greatest slack for a given endpoint, as illustrated in FIG. 5A.

Alternatively, or in addition, the recovery optimizer can improve non-timing metrics at the expense of some WNS and TNS degradation, if desired. In some circumstances, a designer of an IC may wish to improve non-timing metrics, even at some cost to WNS or TNS. For example, early in a design cycle a designer may wish to improve non-timing metrics, even at some cost to WNS or TNS. This can be done, for example, by setting an endpoint path margin based on identifying the lowest slack. This will not protect the critical path, and therefore could affect WNS or TNS, but may provide additional positive slack for optimizing non-timing metrics. As another example, a multiplier greater than 1 could be used (e.g., at 506 illustrated in FIG. 5A, above).

At 552 the recovery optimizer identifies the lowest slack for an endpoint. For example, assume a given endpoint is associated with three paths, or path groups. The recovery optimizer selects the lowest of these values. In an embodiment, this provides a greater increase in slack (e.g., as compared to selecting the greatest slack at 502 in FIG. 5A) which facilitates greater increases in non-timing metrics at the potential expense of WNS or TNS.

At 554, the recovery optimizer determines whether the lowest slack is negative. If yes, the recovery optimizer proceeds to 556. At 556, the recovery optimizer generates the endpoint path margin. In an embodiment, the recovery optimizer uses the same techniques described above in relation to 506. For example, the recovery optimizer can compute the endpoint path margin as [multiplier*slack], where the slack value is the slack selected at 552.

In an embodiment, the recovery optimizer will compute a larger endpoint path margin than if it had selected the greatest slack at 502. For example, assume the endpoint is associated with slack values of −40, −20, and −10, and assume the multiplier is 1. The greatest slack is −10, while the lowest is −40. By selecting the lowest slack for the endpoint, the recovery optimizer will compute an endpoint path margin of 40 (e.g., [1*−40]). This is greater than the value would have been following the techniques illustrated at 506 (e.g., computing an endpoint path margin of 10). In an embodiment, adding an endpoint path margin of 40 to the timing paths (as opposed to 10), will result in significantly greater positive slack and thus significantly more optimizing of non-timing metrics. But this could come at the expense of WNS and TNS, since the critical path is no longer protected.

As discussed above, in an embodiment a recovery optimizer uses an endpoint path margin to improve non-timing metrics while protecting WNS and TNS (if desired). Alternatively, or in addition, a recovery optimizer may directly work on negative slack timing paths and calculate the actual timing margin during optimization (e.g., instead of adjusting slack values using endpoint path margin, as described above). Then the recovery optimizer can control the amount of timing degradation up to the margin value. This approach can be achieved by modifying an existing recovery optimizer to handle negative slack inside the recovery optimizer. In an embodiment, this approach also requires margin calculation and refreshing from a timer module. This is likely to be more complex than the techniques associated with FIGS. 3-6.

Returning to 554, if the lowest slack is not negative, the recovery optimizer skips the endpoint and selects the next endpoint. In an embodiment, computing and applying an endpoint path margin for endpoints with positive slack may degrade timing for recovery optimization. A recovery optimizer can already optimize paths with positive slack (as discussed above), and so no adjustment is needed. This, however, is merely one example. Alternatively, or in addition, the recovery optimizer can also adjust positive slack values to be more positive. For example, this can be useful to meet aggressive targets for non-timing metrics (e.g., early in a design process). While this approach can lead to some timing degradation, it can allow the recovery optimizer to meet the more aggressing targets for non-timing metrics.

Figure 6A:
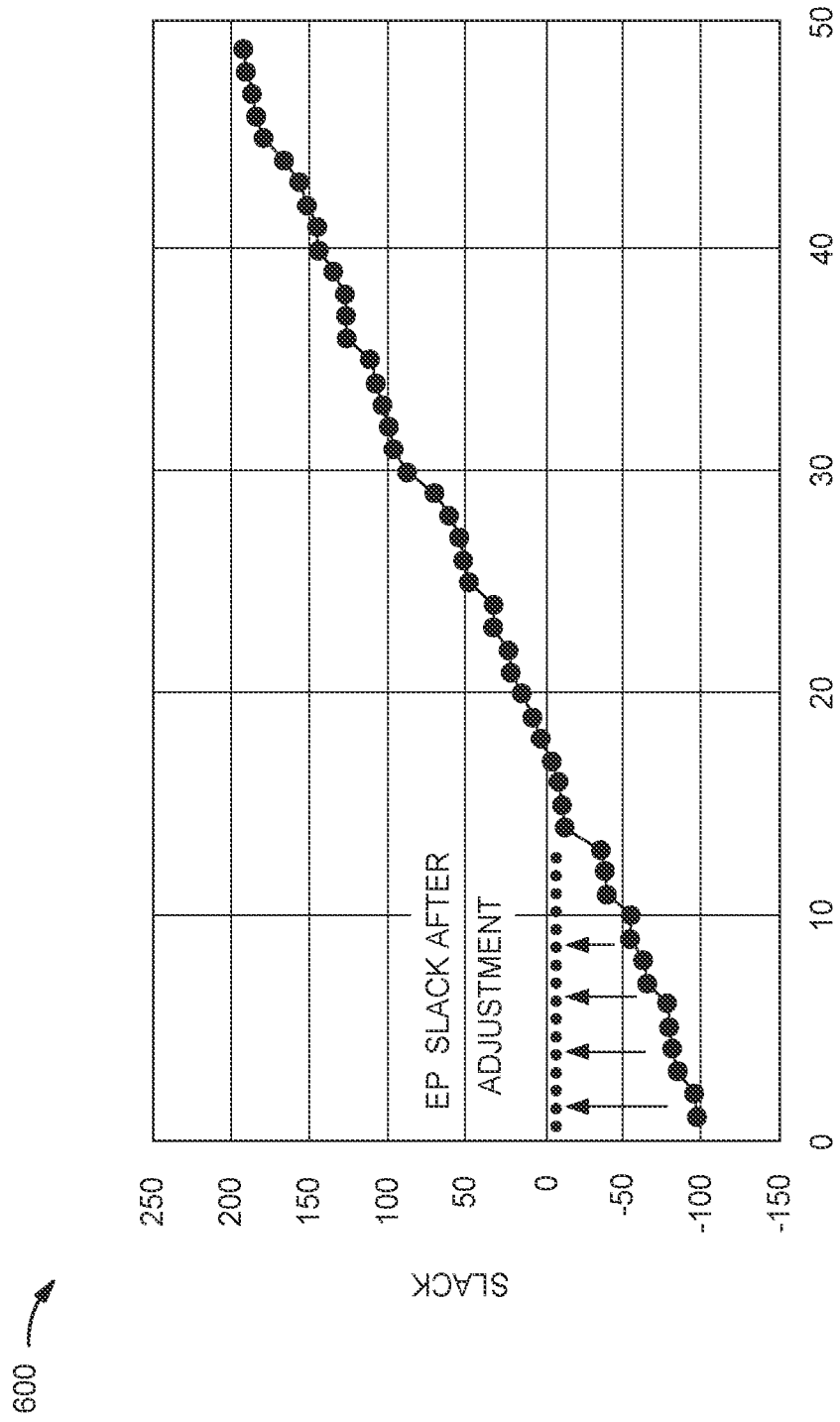
FIG. 6A is a histogram illustrating adjusting endpoint slack for recovery optimization for an IC design, according to one embodiment.

FIG. 6A is a histogram illustrating adjusting endpoint slack for recovery optimization for an IC design, according to one embodiment. In an embodiment, the plot 600 illustrates adjusting an endpoint path margin for sub-critical path recovery (e.g., protecting critical paths). The x-axis illustrates multiple endpoints, by an endpoint identifier (ID). The y-axis illustrates slack at each endpoint (e.g., slack of a critical path for that endpoint). In an embodiment, the endpoints 1-15 have negative slack. The slack of these endpoints is adjusted upward by adding (and later removing) an endpoint path margin, as discussed above in relation to FIGS. 3-5. This allows for a recovery optimizer (e.g., the recovery optimizer 122 illustrated in FIGS. 1-2) to improve non-timing metrics while protecting design timing metrics (e.g., WNS and TNS).

Figure 6B:
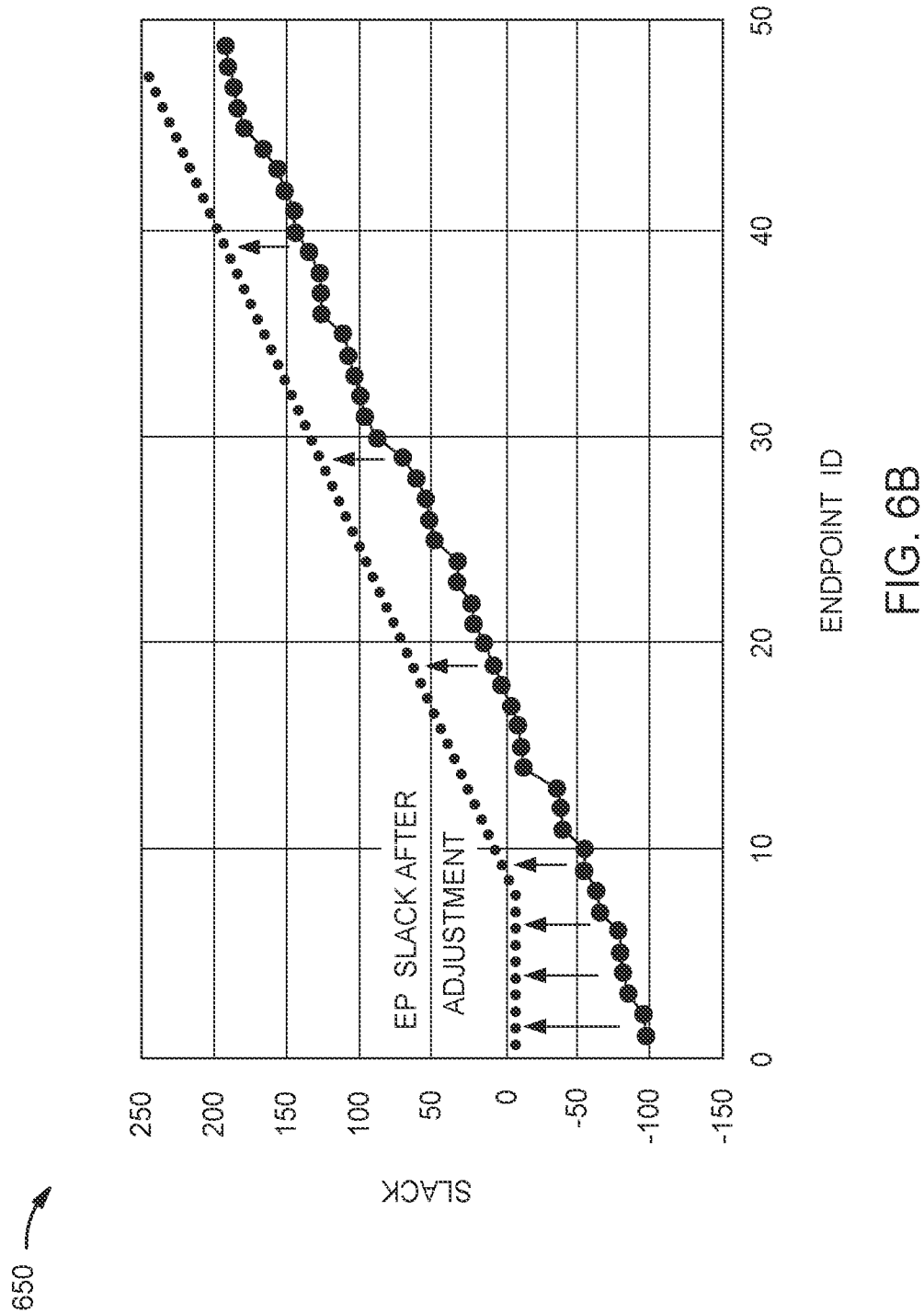
FIG. 6B is a histogram further illustrating adjusting endpoint slack for recovery optimization for an IC design, according to one embodiment.

FIG. 6B is a histogram further illustrating adjusting endpoint slack for recovery optimization for an IC design, according to one embodiment. In an embodiment, the plot 650 illustrates adjusting an endpoint path margin with controlled degradation (e.g., allowing some timing degradation). The x-axis again illustrates multiple endpoints, by endpoint ID. The y-axis illustrates slack at each endpoint (e.g., slack of a critical path for that endpoint). In an embodiment, the slack of endpoints with both negative and positive slack is adjusted using endpoint path margin. For example, in FIG. 6A only endpoints with negative slack are adjusted. In FIG. 6B, endpoints with positive slack are also adjusted (e.g., as discussed above in relation to 504 in FIG. 5A and 554 in FIG. 5B). In an embodiment, as illustrated in FIG. 6B, all endpoints are adjusted. Alternatively, a subset of endpoints can be adjusted. As discussed above, adjusting the slack of endpoints with positive slack can allow for additional improvements in non-timing metrics (e.g., to meet aggressive goals), but does not protect design timing metrics (e.g., WNS and TNS) and allows for some timing degradation. This trade-off may be preferable in some circumstances (e.g., early in a design process). In an embodiment, a designer can configure a recovery optimizer to protect design timing metrics (e.g., as illustrated in FIG. 6A) or to allow for some timing degradation (e.g., as illustrated in FIG. 6B).

Figure 7:
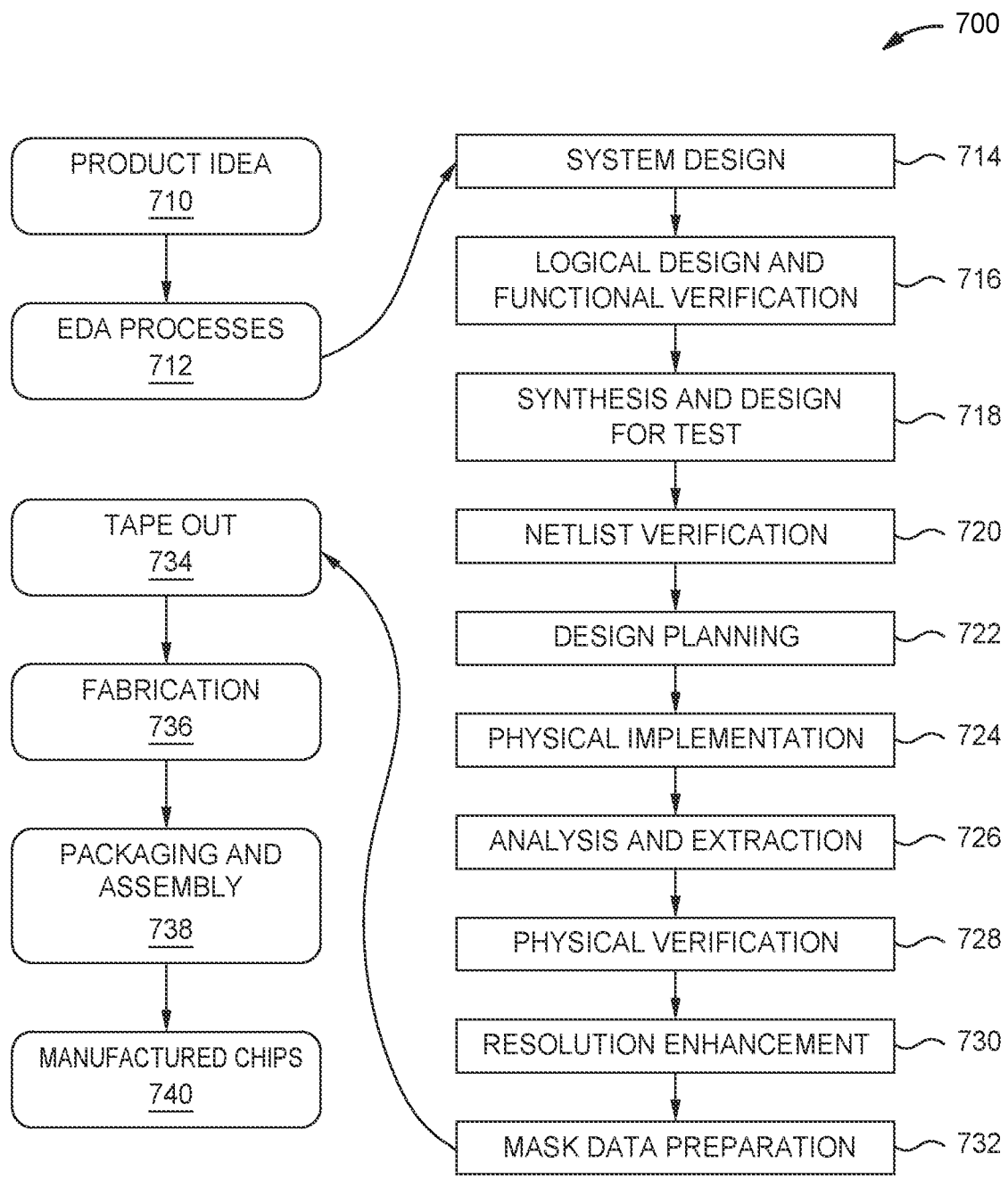
FIG. 7 is a flowchart of various operations in the design and fabrication of an integrated circuit, according to one embodiment.

FIG. 7 is a flowchart of various operations in the design and fabrication of an integrated circuit, according to one embodiment. FIG. 7 illustrates an example set of processes 700 used during the design, verification, and fabrication of an integrated circuit on a semiconductor die to transform and verify design data and instructions that represent the integrated circuit. Each of these processes can be structured and enabled as multiple modules or operations. The term "EDA" signifies Electronic Design Automation. These processes start, at block 710, with the creation of a product idea with information supplied by a designer, information that is transformed to create an integrated circuit that uses a set of EDA processes, at block 712. When the design is finalized, the design is taped-out, at block 734, which is when artwork (e.g., geometric patterns) for the integrated circuit is sent to a fabrication facility to manufacture the mask set, which is then used to manufacture the integrated circuit. After tape-out, at block 736, the integrated circuit is fabricated on a semiconductor die, and at block 738, packaging and assembly processes are performed to produce, at block 740, the finished integrated circuit (oftentimes, also referred to as "chip" or "integrated circuit chip").

Specifications for a circuit or electronic structure may range from low-level transistor material layouts to high-level description languages. A high-level of representation may be used to design circuits and systems, using a hardware description language (HDL) such as VHDL, Verilog, SystemVerilog, SystemC, MyHDL or OpenVera. The HDL description can be transformed to a logic-level RTL description, a gate-level description, a layout-level description, or a mask-level description. Each lower representation level that is a more detailed description adds more useful detail into the design description, such as, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described may be enabled by EDA products (or tools).

During system design, at block 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, at block 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some examples, special systems of components, referred to as emulators or prototyping systems, are used to speed up the functional verification.

During synthesis and design for test, at block 718, HDL code is transformed to a netlist. In some examples, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, at block 720, the netlist is checked for compliance with timing constraints and for correspondence with the HDL code. During design planning, at block 722, an overall floor plan for the integrated circuit is constructed and analyzed for timing and top-level routing.

During layout or physical implementation, at block 724, physical placement (positioning of circuit components, such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction, at block 726, the circuit function is verified at the layout level, which permits refinement of the layout design. During physical verification, at block 728, the layout design is checked to ensure that manufacturing constraints are correct, such as design rule check (DRC) constraints, electrical constraints, lithographic constraints, and that circuitry function matches the HDL design specification. During resolution enhancement, at block 730, the geometry of the layout is transformed to improve how the circuit design is manufactured.

During tape-out, data is created to be used (after lithographic enhancements are applied if appropriate) for production of lithography masks. During mask data preparation, at block 732, the tape-out data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
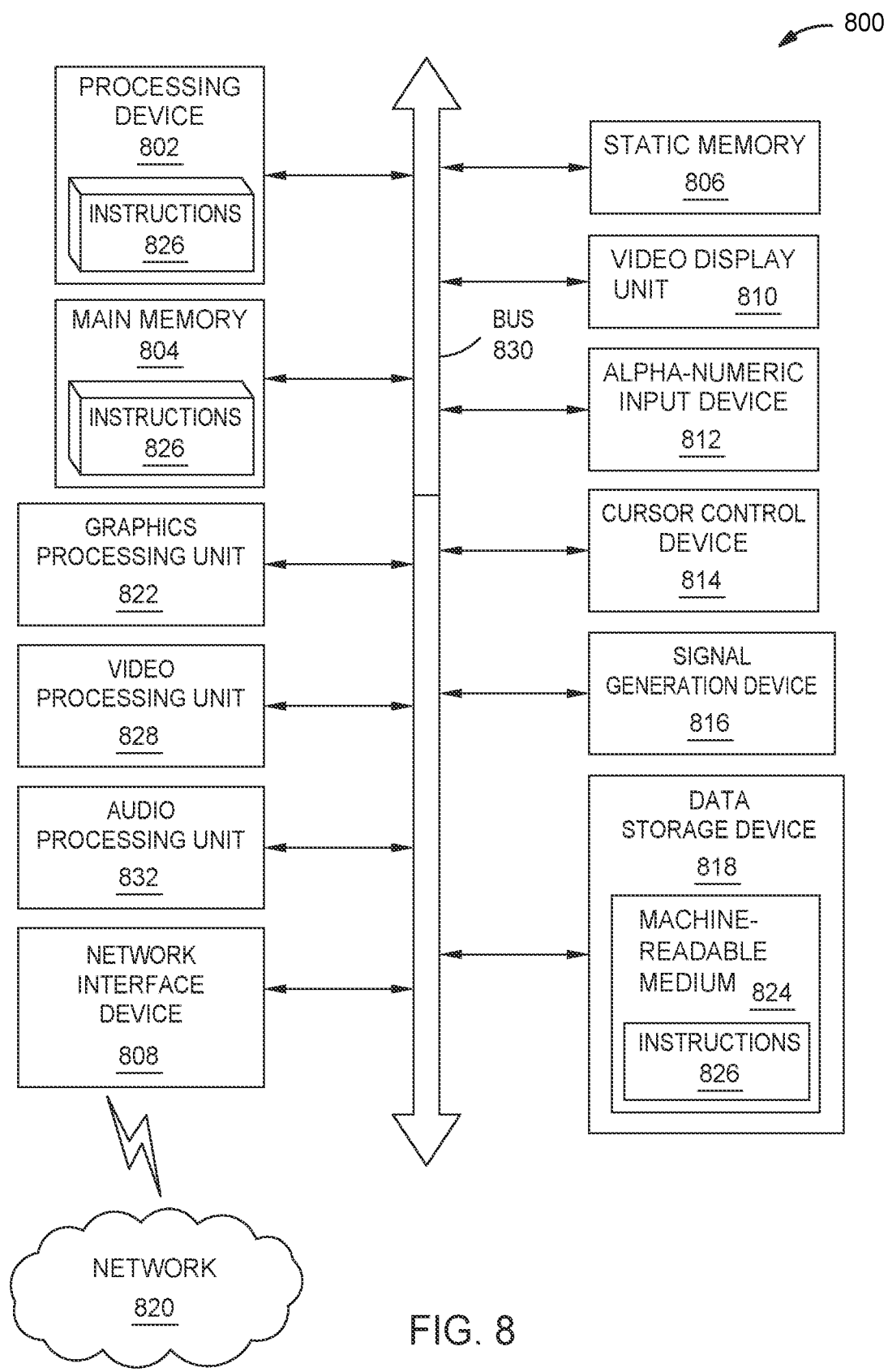
FIG. 8 depicts a diagram of an example computer system in which examples of the present disclosure may operate.

FIG. 8 illustrates an example of a computer system 800 within which a set of instructions, for causing the computer system to perform any one or more of the methodologies discussed herein, may be executed. In some implementations, the computer system may be connected (e.g., networked) to other machines or computer systems in a local area network (LAN), an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term computer system shall also be taken to include any collection of computer systems that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830. The main memory 804 includes or is a non-transitory computer readable medium. The main memory 804 (e.g., a non-transitory computer readable medium) can store one or more sets of instructions 826, that when executed by the processing device 802, cause the processing device 802 to perform some or all of the operations, steps, methods, and processes described herein.

Processing device 802 represents one or more processors such as a microprocessor, a central processing unit, or the like. More particularly, the processing device 802 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing some or all of the operations, steps, methods, and processes described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (e.g., a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also including machine-readable storage media.

In some implementations, the instructions 826 include instructions to implement functionality described above. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 802 to perform any one or more of the methodologies described above. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    determining a path margin for an endpoint of a plurality of timing paths for an integrated circuit (IC) design, comprising:
        identifying a sub-critical path, among the plurality of timing paths, wherein the sub-critical path comprises more slack than a critical path relating to the endpoint, and wherein the critical path is the slowest path, among the plurality of timing paths, for the endpoint; and
        generating the path margin based on a first slack associated with the sub-critical path;
    modifying a second slack relating to at least one of the plurality of timing paths, from a first value to a second value, based on the path margin;
    updating a design metric relating to the IC design based on the modified second slack, wherein the IC design is configured to be used to fabricate an IC; and
    reverting the modified second slack to remove the modification based on the path margin, after updating the design metric.

2. The method of claim 1, wherein the design metric relates to at least one of power, performance, or area (PPA), and wherein updating the design metric results in an improvement to the design metric.

3. The method of claim 2, wherein updating the design metric further results in a degradation in timing for the at least one of the plurality of timing paths and wherein worst negative slack (WNS) and total negative slack (TNS) for the IC design are improved or remain the same.

4. The method of claim 1, wherein determining the path margin for the endpoint of the plurality of timing paths for the IC design further comprises:
    identifying the critical path relating to the endpoint.

5. The method of claim 1, wherein generating the path margin based on the first slack associated with the sub-critical path further comprises:
    identifying the greatest slack among the plurality of timing paths associated with the endpoint.

6. The method of claim 5, further comprising:
    determining that the greatest slack is negative.

7. The method of claim 1, wherein modifying the second slack relating to the at least one of the plurality of timing paths, from the first value to the second value, based on the path margin, comprises increasing the second slack from a negative value to a positive value.

8. The method of claim 1, wherein generating the path margin based on the first slack associated with the sub-critical path further comprises:
    identifying the lowest slack among the plurality of timing paths associated with the endpoint.

9. The method of claim 1, wherein modifying the second slack relating to the at least one of the plurality of timing paths further comprises:
    modifying slack relating to each of the plurality of timing paths, based on the path margin.

10. A system comprising:
    a processor; and
    a memory storing instructions, which when executed by the processor, cause the processor to perform operations comprising:
        determining a path margin for an endpoint of a plurality of timing paths for an integrated circuit (IC) design, comprising:
            generating the path margin based on a first slack associated with a path of the plurality of timing paths;
        modifying a plurality of slacks relating to each of the plurality of timing paths based on the path margin;
        updating a design metric relating to the IC design based on at least one of the modified plurality of slacks, wherein the IC design is configured to be used to fabricate an IC; and
        reverting the modified plurality of slacks to remove the modifications based on the path margin, after updating the design metric.

11. The system of claim 10, wherein the design metric relates to at least one of power, performance, or area (PPA), and wherein updating the design metric results in an improvement to the design metric, wherein updating the design metric further results in a degradation in timing for at least one of the plurality of timing paths, and wherein worst negative slack (WNS) and total negative slack (TNS) for the IC design are improved or remain the same.

12. The system of claim 10, wherein determining the path margin for the endpoint of the plurality of timing paths for the IC design further comprises:
    identifying a critical path relating to the endpoint, wherein the critical path is the slowest path, among the plurality of timing paths, for the endpoint.

13. The system of claim 10, wherein generating the path margin based on the first slack associated with a path of the plurality of timing paths further comprises:

identifying the greatest slack among the plurality of timing paths associated with the endpoint.

14. The system of claim 10, wherein modifying the plurality of slacks relating to each of the plurality of timing paths based on the path margin further comprises increasing at least one of the plurality of slacks from a negative value to a positive value.

15. A non-transitory computer readable medium comprising stored instructions, which when executed by a processor, cause the processor to perform operations comprising:
    determining a path margin for an endpoint of a plurality of timing paths for an integrated circuit (IC) design, comprising:
        determining that a first slack associated with a first timing path, among the plurality of timing paths, is negative; and
        generating the path margin based on the first slack;
    modifying a second slack relating to at least one of the plurality of timing paths, from a first value to a second value, based on the path margin;
    updating a design metric relating to the IC design based on the modified second slack, wherein the IC design is configured to be used to fabricate an IC; and
    reverting the modified second slack to remove the modification based on the path margin, after updating the design metric.

16. The non-transitory computer readable medium of claim 15, wherein determining the path margin for the endpoint of the plurality of timing paths for the IC design further comprises:
    determining that the first slack is the greatest slack among the plurality of timing paths.

17. The non-transitory computer readable medium of claim 15, wherein determining the path margin for the endpoint of the plurality of timing paths for the IC design further comprises:
    determining that the first slack is the lowest slack among the plurality of timing paths.

* * * * *